No. 700,033. Patented May 13, 1902.
J. GLATZ.
RENDERING AND DRYING APPARATUS.
(Application filed June 3, 1901.)
(No Model.)
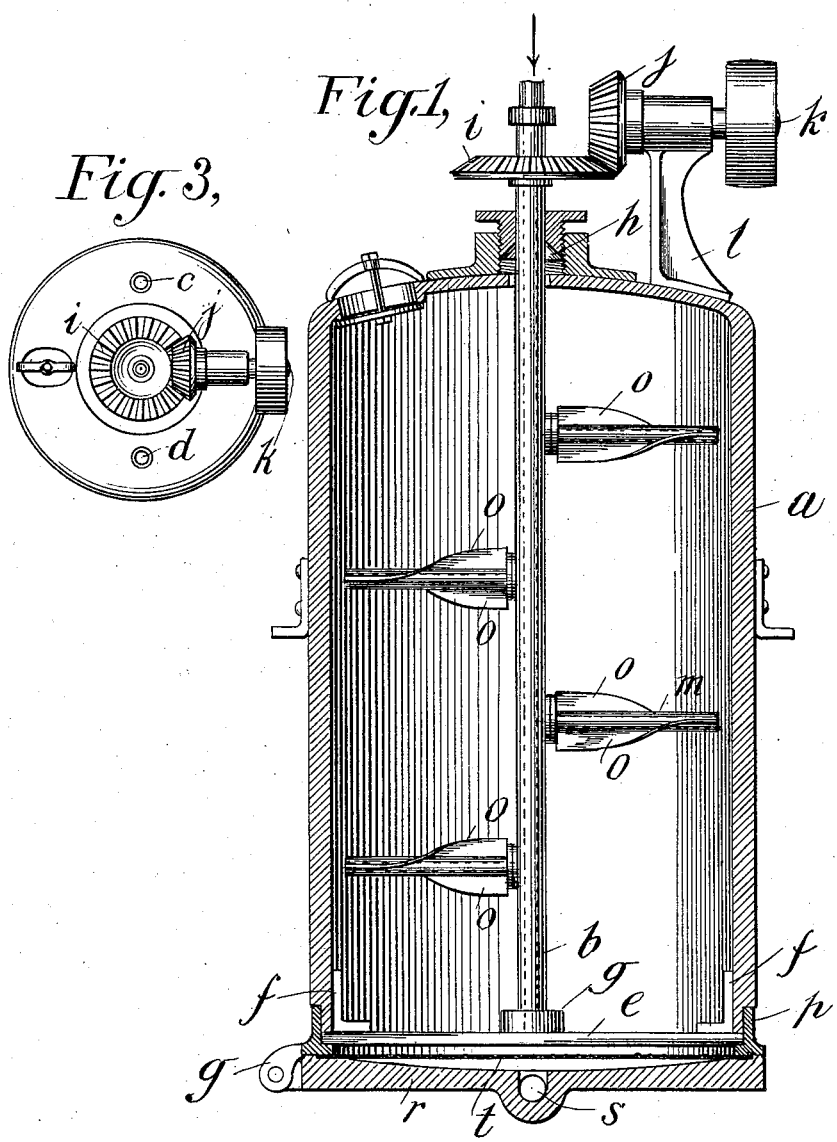
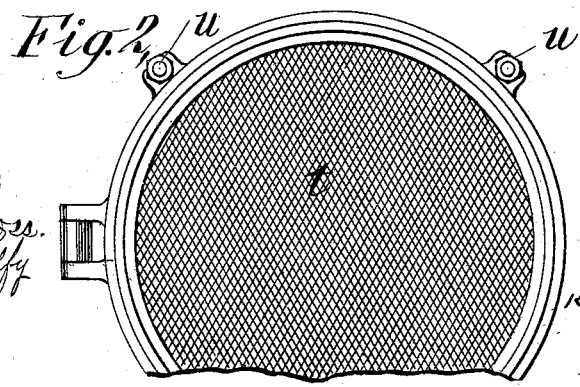
WITNESSES:
Harry Goss.
Henry H. Kralfy
INVENTOR
Joseph Glatz
BY
HIS ATTORNEYS.

UNITED STATES PATENT OFFICE.

JOSEPH GLATZ, OF BROOKLYN, NEW YORK.

RENDERING AND DRYING APPARATUS.

SPECIFICATION forming part of Letters Patent No. 700,033, dated May 13, 1902.

Application filed June 3, 1901. Serial No. 62,843. (No model.)

*To all whom it may concern:*

Be it known that I, JOSEPH GLATZ, a citizen of the United States, residing at New York city, borough of Brooklyn, county of Kings, and State of New York, have invented certain new and useful Improvements in Apparatuses for Separating Liquid from Solid Substances, Filtering the Same, and Drying the Residue, of which the following is a specification, reference being had to the accompanying drawings, which form a part thereof.

My invention will be described with particular reference to the apparatus shown in the accompanying drawings, which apparatus embodies one form of my invention.

In the drawings, Figure 1 is a central vertical section of the apparatus. Fig. 2 is a plan view of the swinging bottom or head; and Fig. 3 is a plan view on a reduced scale, showing the pipes and the manhole.

In the drawings, $a$ indicates the casing of the apparatus, which casing is apertured at the top for the passage of a hollow shaft $b$ and pipes $c\ d$. The casing is provided at the bottom with a cross-bar $e$, suitably supported by brackets $f$. The shaft $b$ is set in a socket $g$, carried by the cross-bar $e$. The hollow shaft $b$ passes through a suitable stuffing-box $h$ and is provided with a bevel-gear $i$, which meshes with a suitable bevel-gear $j$, carried upon the shaft $k$, mounted on the bracket $l$ on the casing $a$. Suitable hollow arms project laterally from the shaft $b$ and are in open communication therewith, so that they may receive steam or gases therefrom. The hollow arms are open-ended, so as to deliver steam or gases into the interior of the casing. The hollow arms $m$ are provided with wings, as $o$, preferably accomplishing a quarter-turn around the said hollow arms. Bolted or otherwise suitably secured to the bottom of the casing is a ring $p$, having one member $q$ of a hinge integral therewith.

$r$ is a suitable head or bottom, shown in the present instance as dished and provided at the center with an outlet-conduit $s$, through which the liquid products may be run off as soon as they are melted. Socketed in the head or bottom is a suitable filtering-screen $t$, covered by a body of filtering material. Swinging fastening-bolts $u$ or other usual fastenings are employed to hold the swinging head firmly against the ring $p$.

The apparatus may be used in the following manner: The vessel is filled or nearly filled with organic substances containing oil or fatty matters. The apparatus shown in the drawings is especially adapted for use with fish or garbage. The apparatus is then closed by closing the manhole, and the hollow shaft $b$ is rotated by power and steam introduced into the mass through the said hollow shaft and the hollow arms $m$. The stirring and treatment with steam have the effect of melting out the oils, fats, and greases contained in the substance or substances treated, and these oils, fats, &c., percolate through the mass and the filtering material along with the hot water of condensation, are thereby filtered, and at once run off through the pipe or passage $s$, so that they will not remain in the apparatus long enough to darken them in color. When the fats, oils, &c., have been thoroughly melted out of the mass, the steam is shut off and heated air at suitable temperature is introduced through the shaft $b$ or pipe $c$, or both. The pipes $c$ and $d$ are merely auxiliary, being used in addition to the pipe $b$ or alone, as the necessities may require.

In order to bring about a rapid drying, the hot air may be introduced through the hollow shaft and arms. The hot air passing through the mass thoroughly dries the mass, and when the mass is thoroughly dried the air is cut off and the swinging head $r$ swung down, allowing the dried mass to be discharged into suitable vessels. This may be further treated to convert it into a valuable fertilizer.

Having described my invention, what I claim, and desire to secure by Letters Patent, is—

1. In a combined rendering and drying apparatus the combination of a casing, a rotary hollow shaft contained within the said casing, hollow arms carried by the said shaft delivering fluid to the interior of said casing, means for rotating the said shaft and a removable head and screen and an outlet for fluid, which may be rendered out, the said outlet being adapted to remain constantly open during the rendering and drying operations.

2. In an apparatus adapted for rendering or drying the combination of a casing, rotary means for introducing and distributing heated fluid into contact with the material to be treated, a sieve at or near the bottom of said casing, a run-off duct or passage receiving melted fats, &c., and means for removably securing the sieve or screen in the casing.

3. In an apparatus adapted for rendering or drying the combination of a casing, a hollow shaft, hollow arms carried on the said shaft and communicating therewith and delivering fluid to the interior of said casing, and stirring-blades carried by the said arms.

4. In an apparatus adapted for rendering or drying the combination of a casing, a rotary means for delivering fluid to the interior of said casing, and into contact with the material to be treated, and a removable head $r$ and a screen $t$.

5. In an apparatus adapted for rendering or drying the combination of a suitable casing, a rotary combined stirring and fluid-delivering apparatus contained therein, the said casing being entirely unobstructed except for the said rotary apparatus, a suitable sieve or screen and means for movably supporting the sieve or screen whereby the charge may be removed from the vessels.

6. In an apparatus adapted for rendering or drying, the combination of a casing, a hollow shaft with means for revolving the said hollow shaft, laterally-projecting fluid-conducting means carried by the said shaft, adapted to deliver fluid to the interior of said casing at points remote from the said shaft, the said laterally-projecting fluid-conducting means carrying means for effecting a stirring action on the mass.

7. In an apparatus adapted for rendering or drying, the combination of a casing, a hollow rotary fluid-distributing device, adapted to distribute fluid into the said casing at the points remote from the center of rotation of the said fluid-distributing device, a liquid-outlet and a sieve contained within the casing whereby fluid may be introduced into the said casing at places throughout the mass contained in said casing whereby a pressure may be brought to bear upon the said mass at widely-different points in order to force moisture out of said mass through the fluid-delivery orifice.

In testimony whereof I have signed my name to this specification, in the presence of two subscribing witnesses, this 28th day of May, 1901.

JOSEPH GLATZ.

Witnesses:
M. C. MISIC,
HENRY W. KIRALFY.